United States Patent
Kuzma (10) Patent No.: US 7,197,566 B1
(45) Date of Patent: Mar. 27, 2007

(54) METHOD AND APPARATUS FOR SELECTING SERVER TO DISTRIBUTE MULTIMEDIA DATA VIA A NETWORK

(75) Inventor: Andrew J. Kuzma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 09/675,756

(22) Filed: Sep. 29, 2000

(51) Int. Cl.
*G05F 15/16* (2006.01)

(52) U.S. Cl. ..................................... 709/227

(58) Field of Classification Search ............... 709/226, 709/225, 203, 229, 223, 217, 219, 227, 228; 705/14
See application file for complete search history.

(56) References Cited

U.S. PATENT DOCUMENTS

| | | | | |
|---|---|---|---|---|
| 5,581,552 A * | 12/1996 | Civanlar et al. | ............ | 370/396 |
| 5,644,720 A * | 7/1997 | Boll et al. | ................... | 709/227 |
| 5,740,371 A * | 4/1998 | Wallis | ........................ | 709/229 |
| 5,826,242 A * | 10/1998 | Montulli | ...................... | 705/27 |
| 5,848,396 A * | 12/1998 | Gerace | ......................... | 705/10 |
| 5,944,790 A * | 8/1999 | Levy | ............................ | 709/218 |
| 5,956,716 A * | 9/1999 | Kenner et al. | ................ | 707/10 |
| 5,960,411 A * | 9/1999 | Hartman et al. | .............. | 705/26 |
| 6,003,030 A * | 12/1999 | Kenner et al. | ................ | 707/10 |
| 6,092,196 A * | 7/2000 | Reiche | ........................ | 713/200 |
| 6,101,482 A * | 8/2000 | DiAngelo et al. | ............ | 705/26 |
| 6,178,460 B1 * | 1/2001 | Maddalozzo et al. | ....... | 709/239 |
| 6,182,139 B1 * | 1/2001 | Brendel | ....................... | 709/226 |
| 6,317,792 B1 * | 11/2001 | Mundy et al. | ............... | 709/227 |
| 6,374,300 B2 * | 4/2002 | Masters | ....................... | 709/229 |
| 6,430,276 B1 * | 8/2002 | Bouvier et al. | ......... | 379/121.01 |
| 6,510,451 B2 * | 1/2003 | Wu et al. | .................... | 709/203 |
| 6,513,061 B1 * | 1/2003 | Ebata et al. | ................ | 709/203 |
| 6,578,066 B1 * | 6/2003 | Logan et al. | ................ | 718/105 |
| 6,606,643 B1 * | 8/2003 | Emens et al. | ............... | 709/203 |
| 6,611,859 B1 * | 8/2003 | Kohno | ......................... | 709/203 |
| 6,665,702 B1 * | 12/2003 | Zisapel et al. | .............. | 718/105 |
| 6,711,606 B1 * | 3/2004 | Leymann et al. | ........... | 709/203 |
| 6,785,704 B1 * | 8/2004 | McCanne | .................... | 718/105 |
| 6,829,654 B1 * | 12/2004 | Jungck | ......................... | 709/246 |
| 2001/0049741 A1 * | 12/2001 | Skene et al. | ................. | 709/232 |
| 2003/0036949 A1 * | 2/2003 | Kaddeche et al. | ............ | 705/14 |

OTHER PUBLICATIONS

Thomas, "Recipe for E-Commerce," Nov./Dec. 1997, IEEE Internet Computing, vol. 1, Issue 6, pp. 72-74.*
Kopparapu, "Persistence Methods Key for E-Comm," Apr. 24, 2000, Network World, vol. 17, Issue 17, p. 45.*
The Guardian, "Computing and the Net: Cache and Carry," Jun. 25, 1998, The Guardian, Manchester, UK, p. T.*
Law et al., "A Scalable and Distributed WWW Proxy System," Jun. 6, 1997, Proceedings, IEEE Conference on Multimedia Computing and Systems '97, pp. 565-571.*

* cited by examiner

*Primary Examiner*—Krisna Lim
*Assistant Examiner*—Sean Reilly
(74) *Attorney, Agent, or Firm*—Blakely, Sokoloff, Taylor & Zafman LLP (57) ABSTRACT

A receiver receives information. A selector couples to the receiver to select a server based on the received information. A transmitter couples to the selector to transmit a multimedia stream from the selected server to a viewer via a network.

23 Claims, 11 Drawing Sheets

METHOD AND APPARATUS FOR SELECTING SERVER TO DISTRIBUTE MULTIMEDIA DATA VIA A NETWORK

BACKGROUND

1. Field

This invention relates to multimedia data. In particular, the invention relates to distributing multimedia data.

2. General Background

Techniques to deliver multimedia data to the viewing audience are widely used by interactive multimedia services. A technique for transferring data such that it can be processed as a steady and continuously stream is called streaming. Streaming technology is becoming increasingly important with the growth of the Internet, because most of the viewing audience (e.g., users) do not have fast enough access to download large multimedia files quickly. In addition to limited bandwidth to transfer a complete file prior to viewing (which might take too long), streaming media players are intended for viewing-only, i.e., after viewing content, it is not stored on the user's computer.

The streaming technology is used by both residential and commercial sectors. Services available to the residential sector include video-on-demand for movies, news, sports, television programs, home shopping, interactive games, surrogate travel, and a wide variety of educational and information services, to name a few. Services available to the commercial sector include video mail, conference records, multimedia manuals, training, and industry specific uses such as video footage of homes for sale used in the real estate industry and video footage of vacation resorts in the travel industry.

There is an increasing demand from the viewing audience to receive quality data packets embedded in multimedia streams. Currently, an internet protocol (IP) provides a means for data packets to be routed across underlying networks. The IP does this by providing both a destination address and a source address as part of the data packet sent on the network. With the current IP addressing and networking, it is not possible to fully determine where the viewing audience is with respect to the to the edge sites (servers) due to the facts that the IP address may be reassigned without regard to geographic or political boundaries. When the IP address is reassigned, the edge site that serves the viewing audience the multimedia streams may not be the best edge site to distribute the data because it may not be close in proximity with the viewer or viewing system. Also, when the IP address associating with an edge server is reassigned, user may be directed to an edge site that is not the closest regional internet to the user. This is likely to result in reduced quality because the data stream has to pass through IP exchanges and a busy network link between the regional internets.

Therefore, there is a need to have a technique that provides quality delivery of multimedia streams to the viewing audience.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

In the following description, terminology is used to discuss certain features of the present invention. For example, a "system" includes hardware equipment and/or software that process information. Examples of a system include, but are not limited or restricted to a computer (e.g., a desktop, a laptop, a hand-held, a server, a workstation, etc.), desktop office equipment (e.g., printer, scanner, a facsimile machine, etc.), a wireless telephone handset, a television set-top box, and the lice. The term "information" is defined as one or more of data, address, and/or control. The term "server" or "sites" is used interchangeably and is defined as a computer that stores applications and information within a network for access by other computers (as opposed to one configured to interact directly with users and peripherals). The term "edge server" or "edge site" is used interchangeably and is defined as a server that is physically located close to its users designed to deliver faster, higher quality transmissions, typically in a local commercial Internet Service Provider (ISP) facility. The number of edge servers in a region depends on the number of users in the locale. The term "streaming" is defined as the delivery of a rich media event (audio or video) to an end user in real-time, that is, without the need for prior downloading of the content in its entirety. The user's sensory experience should be much like that of viewing television or listening to the radio.

Figure 1A:
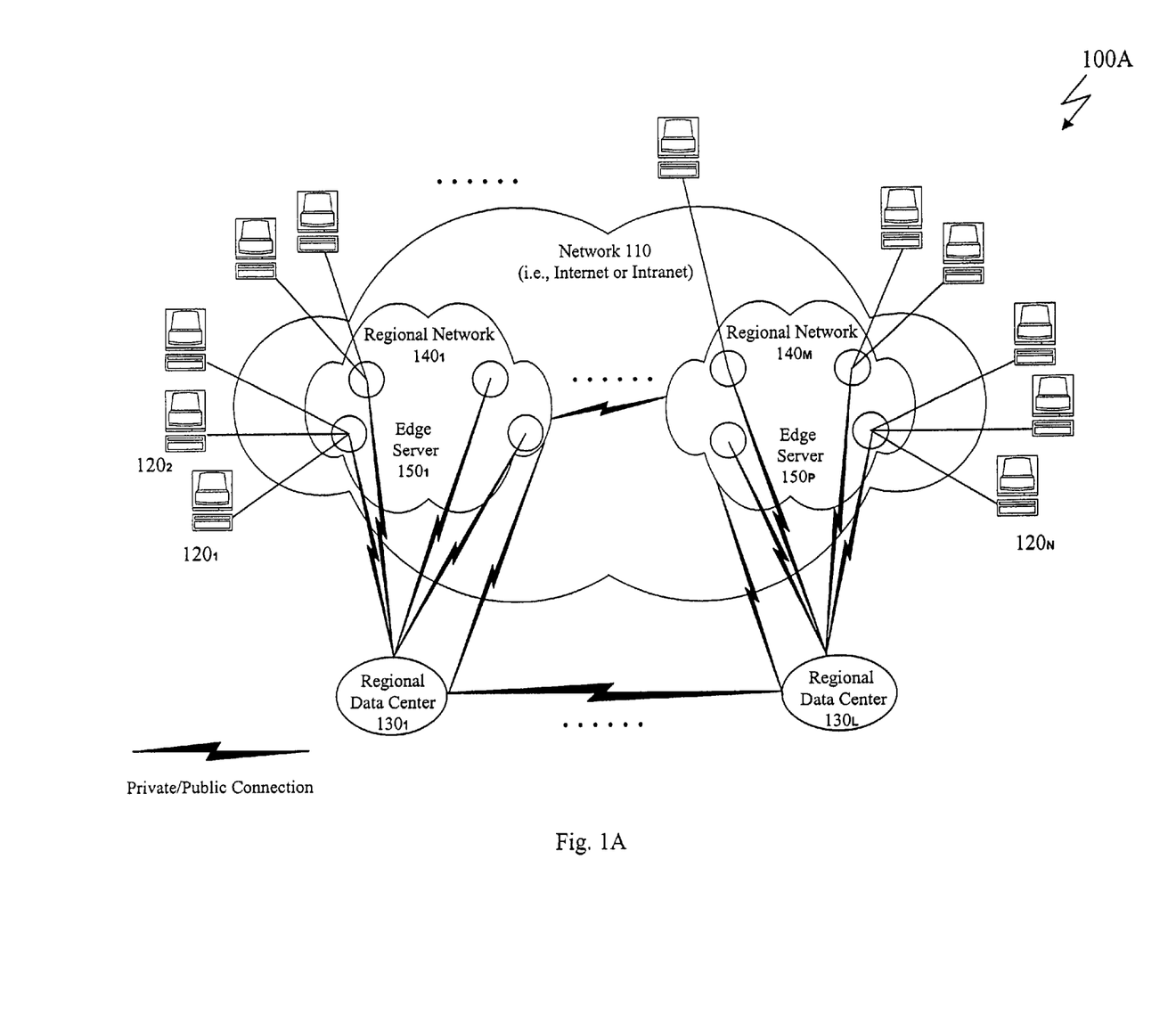
FIG. 1A is a diagram illustrating a block diagram of a distributed media system according to one embodiment of the invention.

FIG. 1A is a diagram illustrating a distributed multimedia system according to one embodiment of the invention. The system 100A includes a network (internet or intranet) 110, viewing systems $120_1$ to $120_N$, and regional data centers $130_1$ to $130_L$. It is noted that the network system 110 may be a global internet network or a global intranet network.

The network system 110 operates within a network system such as Local Area Network (LANs) and Wide Area Networks (WANs). The networking system is build by internet network provider(s). The internet network providers typically built their networks in smaller regional groupings and very often have distinct continental regions (e.g., North America, Europe, Asia, etc.). The reasons for the groupings include network management, cost factors of the WAN links between regions, deployment history, and local regulatory agencies.

The network system 110 connects millions of computers (e.g., viewing systems, regional data centers, edge sites, etc.) and may be divided into regional network systems $140_1$ to $140_M$. Each regional network system (i.e., internet protocols) $140_1$ to $140_M$ includes edge servers or edge sites $150_1$ to $150_P$. The edge servers $150_1$ to $150_P$ use the regional network systems $140_1$ to $140_M$ as means for routing data packets or content across the network system in the network system 110. The data packets or contents may be multimedia contents or data that are transferred via a streaming technique to generate multimedia stream. The edge servers $150_1$ to $150_P$ are connected to the viewing systems $120_1$ to $120_N$ to provide the viewing systems $120_1$ to $120_N$ with multimedia streaming data. The connections among the regional data centers $130_1$ to $130_L$, or the connections between the regional data centers $130_1$ to $130_L$ with the edge servers $150_1$ to $150_P$, or with the viewing systems $120_1$ to $120_N$, may be private IP connections or public IP connections. Also, the regional data centers $130_1$ to $130_L$ are connected together in private or public IP connection. In other words, the connections in the distributed multimedia content system 100B are multiply-connected both through public IP peering exchanges and numerous private peering exchanges. The types of underlying connections vary from Densed Wavelength Division Multiplexing (WDM), to Asynchronous Transfer Mode (ATM), to Ethernet, to dial-up modems.

The viewing systems $120_1$ to $120_N$ include computer systems and are sometimes called nodes in the network. The servers $150_1$ to $150_P$ are computers or devices that allocate resources for the network. There are several types of servers (e.g., file, print, network, and database). The file server is a computer and storage device dedicated to storing files. Any user in the network can store files on the server. A print server is a computer that manages one or more printers, and a network server is a computer that manages network traffic. A database server is a computer system that processes database queries. Servers are often dedicated, meaning that they perform no other tasks besides their server tasks. On multiprocessing operating systems, however, a single computer can execute several programs at once. A server in this case could refer to the program that is managing resources rather than the entire computer. For the purpose of the illustrating the present invention, the server used is defined as an edge server from the plurality of servers $150_1$ to $150_P$ and is used as a tool to deliver or distribute the content to the viewing systems $120_1$ to $120_N$.

The viewing systems $120_1$ to $120_N$ may also obtain the multimedia streaming data directly from the regional data centers $130_1$ to $130_L$. The viewing systems $120_1$ to $120_N$ are systems that receive the contents that are processed as a steady and continuous stream. For viewing systems who do not have fast enough access to download large multimedia file quickly, the streaming technology facilitates the interaction by displaying the data before the entire file has been transmitted. The viewing systems $120_1$ to $120_N$ receive the multimedia content from edge servers $150_1$ to $150_P$. An application running on a viewing system processes the multimedia stream and converts it to sound or pictures. The viewing system 120 may save excess data in a buffer when it receives receive the data more quickly than required.

Figure 1B:
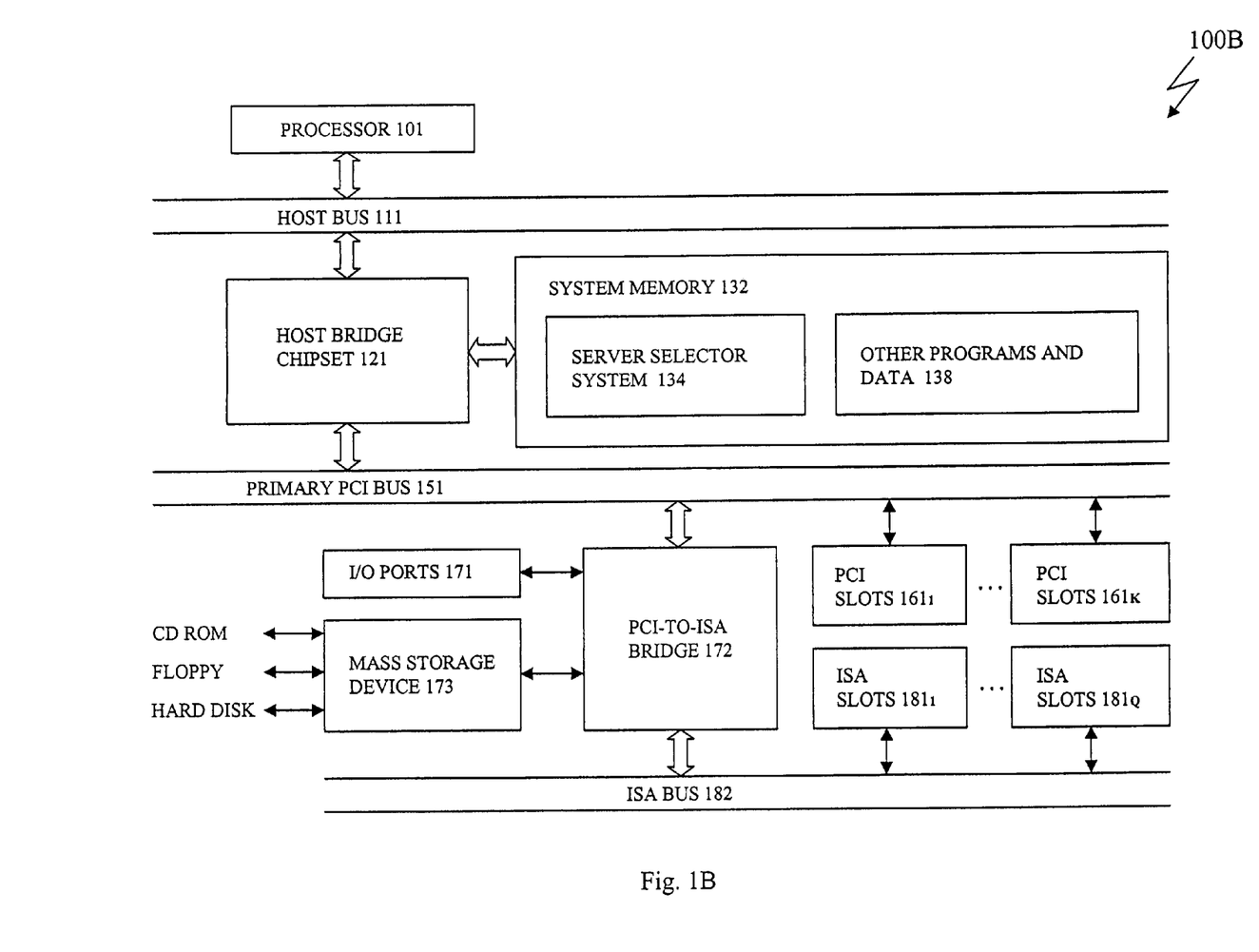
FIG. 1B is a diagram illustrating a computer system in which one embodiment of the invention can be practiced.

FIG. 1B is a diagram illustrating computer system 100B in which embodiment of the present invention can be practiced. The computer system 100B includes a processor 101, a host bus 111, a host bridge chipset 121, a system memory 132, a primary peripheral component interconnect (PCI) bus 151, PCI slots $161_1$ to $161_K$ ("K"$\geq$2), a PCI-to-industry standard architecture (ISA) bridge 172, mass storage device 173, Input/Output (I/O) ports 171, an ISA bus 182, and ISA slots $181_1$ to $181_Q$ ("Q"$\geq$2).

The processor 101 represents a processing unit of any type of architecture. For example, the processor 101 may be implemented as a microcontroller, a digital signal processor, a state machine, or a central processing unit (CPU). The CPU may be implemented with a variety of architecture types such as complex instruction set computers (CISC), reduced instruction set computers (RISC), very long instruction word (VLIW), or hybrid architecture.

The host bridge chipset 121 includes a number of interface circuits to allow the processor 101 access to the system memory 132 and the primary PCI bus 151. The system memory 132 represents one or more mechanisms for storing information. For example, the system memory 132 may include non-volatile or volatile memories. Examples of these memories include flash memory, read only memory (ROM), or random access memory (RAM). In the computer system 100B, the system memory 132 may contain a program that can implement the distributed media system and other programs or data. In the computer system 100B, the system memory may contain a program that can implement selecting an edge server from the edge servers $150_1$ to $150_P$. The program in the computer system 100B may be a software program or a firmware program. Of course, the system memory 132 preferably contains additional software (not shown), which is not necessary to understanding the invention.

The PCI slots $161_1$ to $161_K$ provide interfaces to PCI devices. Examples of PCI devices include the network interface and the media interface. The network interface connects to communication channel such as the Internet. The Internet provides access to on-line service providers, Web browsers, and other network channels. The media interface provides access to audio and video devices.

The PCI-to-ISA bridge 172 provides access to the ISA bus 182, mass storage devices 173, and input/output (I/O) ports 171. The I/O ports 171 provides interface to I/O devices (not shown). The I/O devices may include any I/O devices to perform I/O functions such as a media card (e.g., audio, video, graphics), a network card and the like. The mass storage device 173 includes a machine readable media such as a compact disk (CD) ROM, a digital video disk (DVD), floppy diskette, hard drive, and the like. The mass storage device 173 stores archive information such as code, programs, files, data, applications and operating systems. The mass storage device 173 provides a mechanism to read the machine-readable media.

When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc. The ISA bus 182 has a number of ISA slots $181_1$ to $181_M$ to interface to ISA devices. Examples of ISA devices include data entry devices (e.g., keyboard, mouse, trackball, pointing device), printers, etc.

Computer system may install a software application (e.g., Web browser) which is used to locate and display Web pages. The software application used may be Netscape Navigator or Microsoft Internet Explorer or any other commercial browsers. These software application display graphics, text as well as presentation of multimedia information including sound and video. The presentation of the multimedia information may require plug-ins for some formats.

Figure 1C:
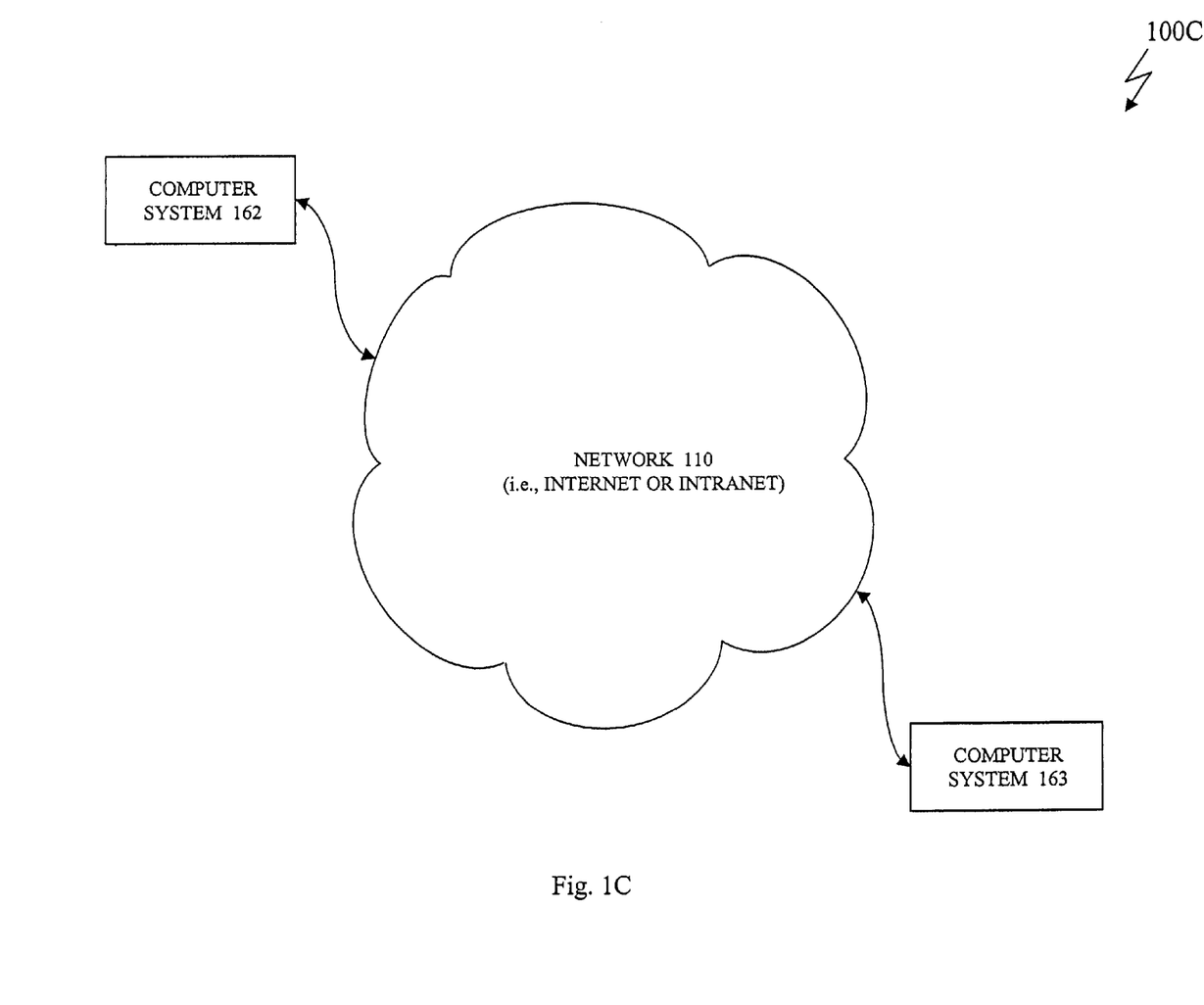
FIG. 1C is a diagram illustrating a block diagram of a distributed media system according to another embodiment of the invention.

FIG. 1C is a diagram illustrating a distributed multimedia system according to one embodiment of the present invention. The distributed multimedia system includes a computer system 162, a computer system 163, and a network system 110.

The computer systems 162 and 163 may be the viewing system 120 and computer system for the interactive multimedia service, respectively and vice versa. Each system may be implemented as the computer system shown in FIG. 1B. The computer system 163 may also be implemented in the regional data center 130. When the computer system 162 requests for the multimedia streams from the computer system 163, the computer system 162 accesses the network system 110. The computer system 163 transmits the multimedia streams to the computer system 162 via the server 150 in the network 110. Either computer system may include the server selector system 134 (shown in FIG. 1B). If the server selector system 134 is implemented by programming code, the code is stored in the system memory 132 (shown in FIG. 1B). Otherwise, the server selector system 134 is implemented by hardware in the computer system 162 or 163.

When the invention is implemented by codes, it is implemented as a program (i.e., applet). This program may be designed to be executed from within another application. This program can be invoked from many different applications. For example, web browsers which is are equipped with Java virtual machine, can interpret this program from web servers. In one embodiment, the program is executed from an applications installed in the computer system. In another embodiment, the program is executed from an application accessible from a browser.

Figure 2:
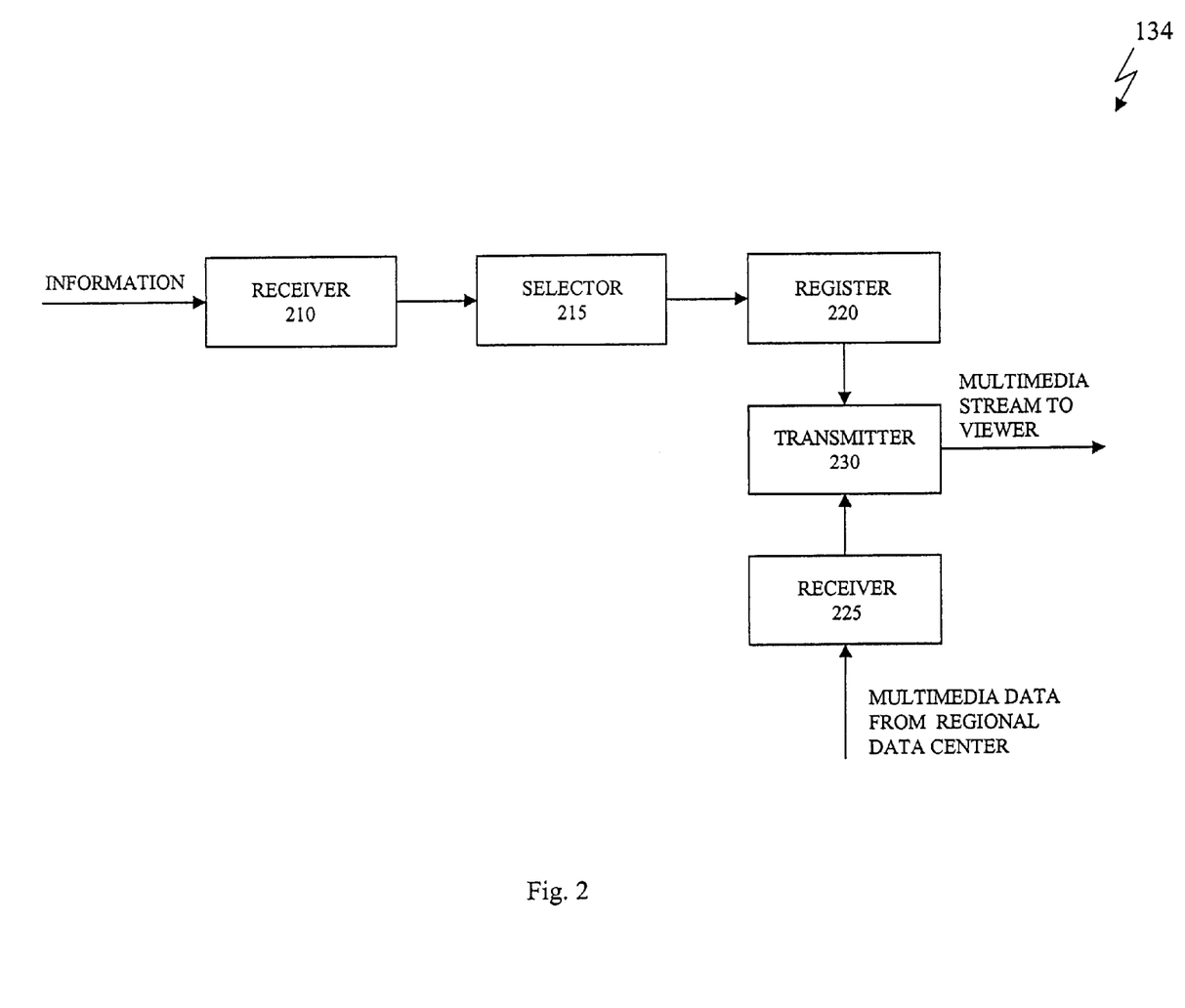
FIG. 2 is a diagram illustrating a block diagram of a server selector system according to one embodiment of the invention.

FIG. 2 illustrates a block diagram of the server selector system 134 according to one embodiment of the present invention. The server selector system 134 includes a receiver 210, a selector 215, a register 220, a receiver 225, and a transmitter 230.

The receiver 210 receives information from a viewing system from the plurality of viewing systems $120_1$ to $120_N$ and inputs the received information to the register 220. The received information may be information about a server selected by the viewing system from a list of all available servers $150_1$ to $150_P$ in the network. The list obtained by the viewing system may be from printed materials, Web access, or the list is provided to viewing at the setup time of the viewing system. From the list, the viewer selects the servers of its choice and inputs the information to the receiver 210. The selector 215 selects an edge server based on the selected information from the receiver 210. The register 220 registers the selected servers to a service provider. The information registered may be addresses of the selected servers. The service provider stores the addresses of the selected servers in a storage. The service provider manages the servers (including edge site servers) in the network. It is noted that there may be more than one selected servers.

When multimedia streams from the multimedia service are requested by the viewing system by the viewer, the service provider avails the addresses of the selected servers. The receiver 225 receives the multimedia data from the service provider and converts the multimedia data into a multimedia stream. The transmitter 230 couples to the receiver to transmit the multimedia streams to the viewing system through the selected servers.

In one embodiment, the distributed multimedia system is implement by codes or program. The codes or program, running on the viewer computer system, registers the selected servers with the service provider. The codes or program may be an application that is designed to execute directly from the operating system (OS) of the viewing computer system. The codes or program may be implemented in an applet form also. The applet is designed to be executed from within an application installed in the viewing computer system. This applet is designed in ways that it can be invoked from many different applications. For example, web browsers that are equipped with Java virtual machines, can interpret the applet from the web server. The applet may have small files size, cross-platform compatible, and is highly secure (since it cannot be used to access viewer's hard drive). The applet is often used for small internet applications accessible from the web browser. The applet may be run on the viewing computer system or through a web application.

The applet is designed to provide viewers with several alternatives when registering with the service provider. One alternative is that the applet registers with the service provider numerous servers in which the viewer specifies as a first choice, second choice, third choice, etc. Another alternative is that the applet may register different servers with different service providers under the direction of the viewer. For example, the viewer may direct the applet to register its first choice of a server with a service provider, and its second of another server with another service provider or the viewer may direct the applet to register its first choice and second within the same service provider. Yet, another alternative is that the applet is to register with a service provider of the viewer's choice and a best-available server is chosen for the viewer when the viewer requests for a content (e.g., multimedia stream).

The applet provides that service provider with information that includes address and a unique identifier (ID). The unique ID may be a global viewer ID number, a Network Interface Card (NIC) serial number. The unique ID may also be provided by the service provider and is provided back to the service provider when a multimedia stream is requested from the viewer. When registering with the service provider, the applet obtains a registration number from the service provider and stores it in the viewer computer system for later use.

When the viewer requests a multimedia stream, the registration number is provided together with the request. From this registration number, a server is selected based on the registration number and the multimedia stream is transmitted to the viewer via the selected server. This selected server may be the one that the viewer specifically selected or it may be selected by the service provider based on the information obtains from the applet in the registering process. In this case, the best-available server is selected to transmit the multimedia stream to the viewer. The best-available server may be the closest-available server, the least-busy server, or the server having the highest data rate, etc.

Figure 3:
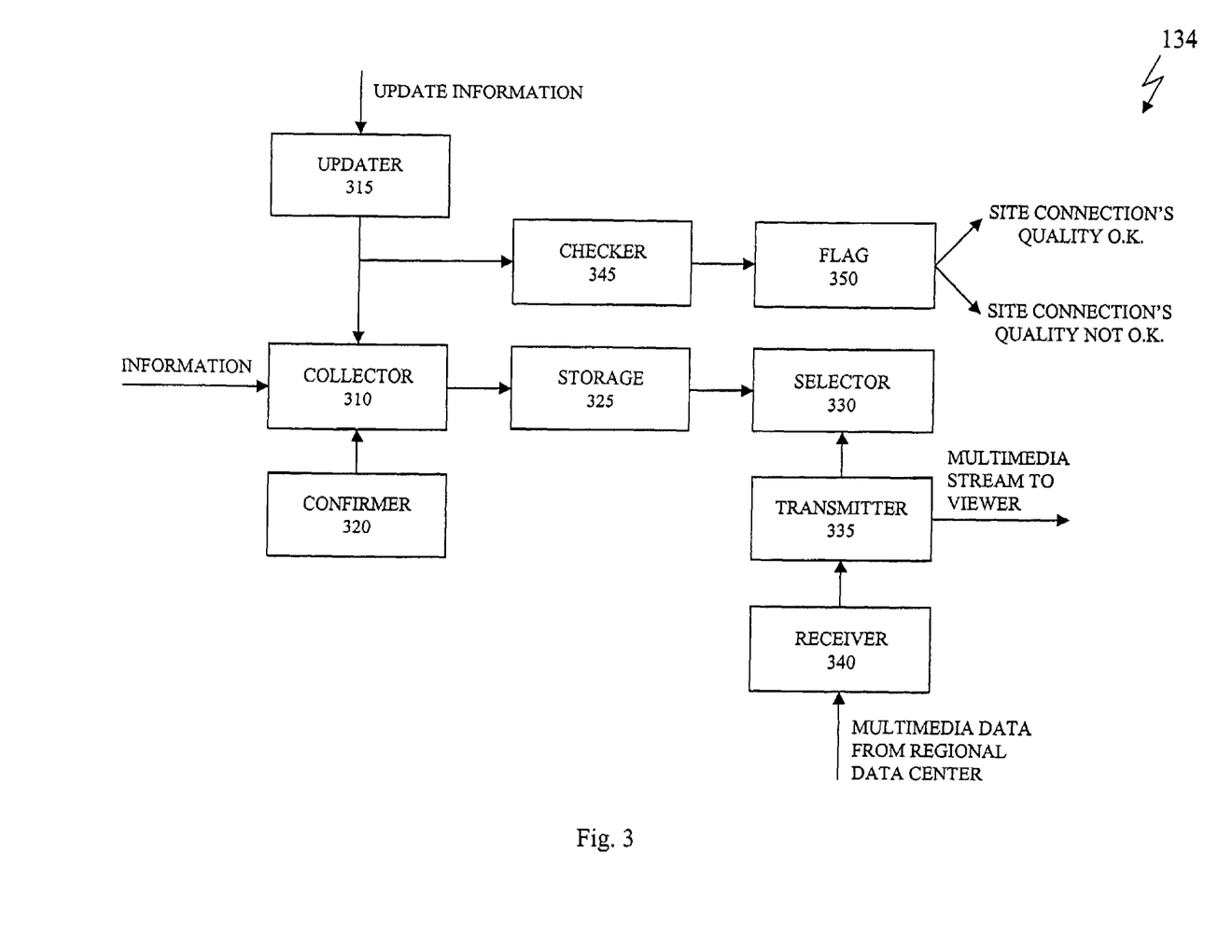
FIG. 3 is a diagram illustrating a block diagram of the server selector system according to another embodiment of the invention.

FIG. 3 is a diagram illustrating the server selector system 134 according to another embodiment of the invention. The distributed media system 300 includes a collector 310, an updater 315, a confirmer 320, a storage 325, a selector 330, a transmitter 335, a receiver 340, a checker 345, and a flag 350. Elements in the server selector system 134 may be implemented by hardware, software, or firmware or any by any combination thereof.

The collector 310 collects information from the viewer. The information may be local information such as language preference, time zone. The information may also include the viewer location identified by the viewer address. Information collected by the collector 310 may be information regarding the addresses of the edge sites in the network. The addresses of the edge sites is updated by the updater 315 before the delivering of the addresses to the collector 310. The updating feature is available to provide future expansion and changes in the global internet environment. Future expansion may be caused by an expansion in the number of viewers, an expansion in geographic area, an expansion in the number of services and the like. Changes may be caused by law and regulations where the servers or the viewers are located, etc.

The checker 345 uses the information or the updated information about the network addresses of the edges site to check for the quality of the connection of the edge sites. The checker then generates a flag 350 to indicate whether the quality of the connections is good or not.

The confirmer 320 may be used to confirm whether the information regarding the viewer location is correct. If the viewer locations is not correct, the confirmer 320 corrects it and sends the correct location address to the collector 310. The collected information is stored in the storage 325.

The selector 330 retrieves the information in the storage 325 and makes the selection of the edge sites that are to be used in the delivering of the multimedia data. The selection of the edge sites is based on the local information or the edge site deployment or in combination thereof. The selector 330 selects a small number of possible candidate sites to be used in the delivering of the multimedia data.

When the viewer requests a multimedia stream, the selector 330 selects an edge site from the small number of possible sites that the selector 330 determines to be the best choice to deliver the multimedia stream.

The transmitter 335 and the receiver 340 perform the same functions as the transmitter 230 and receiver 225 respectively as shown in FIG. 2.

When the distributed media system 300 is implemented by codes or program such as an applet, the applet runs in the background of the viewers systems. The applet includes multiple modules correspond to the elements such as the collector 310, updater 315, etc., as discussed above. For example, the collector module 310 gathers local information such as language preference, time zone, and viewer information such as location of the viewer. The confirmer module 320 may ask the viewer to confirm its location. The viewer may provide the collector module 310 additional information such as information about the viewer computer system, local regulations, and any information that would assist the selector module to select the best server for the viewer under a present circumstance. The collector module 310 is also provided with information about the network addresses of servers (e.g., edge sites), the information is stored in the storage module 524 and is retrieved to be inputted to the selector 330. The information regarding the edge servers may be updated to provide future expansion and changes. The checker module 345 uses the information about the edge server to make periodic checks for the connection quality to edge servers (e.g., sites). The selector module 330 uses, in combination or separate, the viewer information and servers deployment to select a number of candidate servers (sites) that are the potential servers for transmitting multimedia stream to viewer. When the viewer requests a multimedia stream, the selector module 330 selects a server that it believes to be the best choice for the viewer. The selector module 330 may be running in the viewing system or in the service provider system. In the dynamic environment (e.g., changes in information), the selector module dynamically determines which servers are best based on the obtained information from the viewer and the servers.

Figure 4:
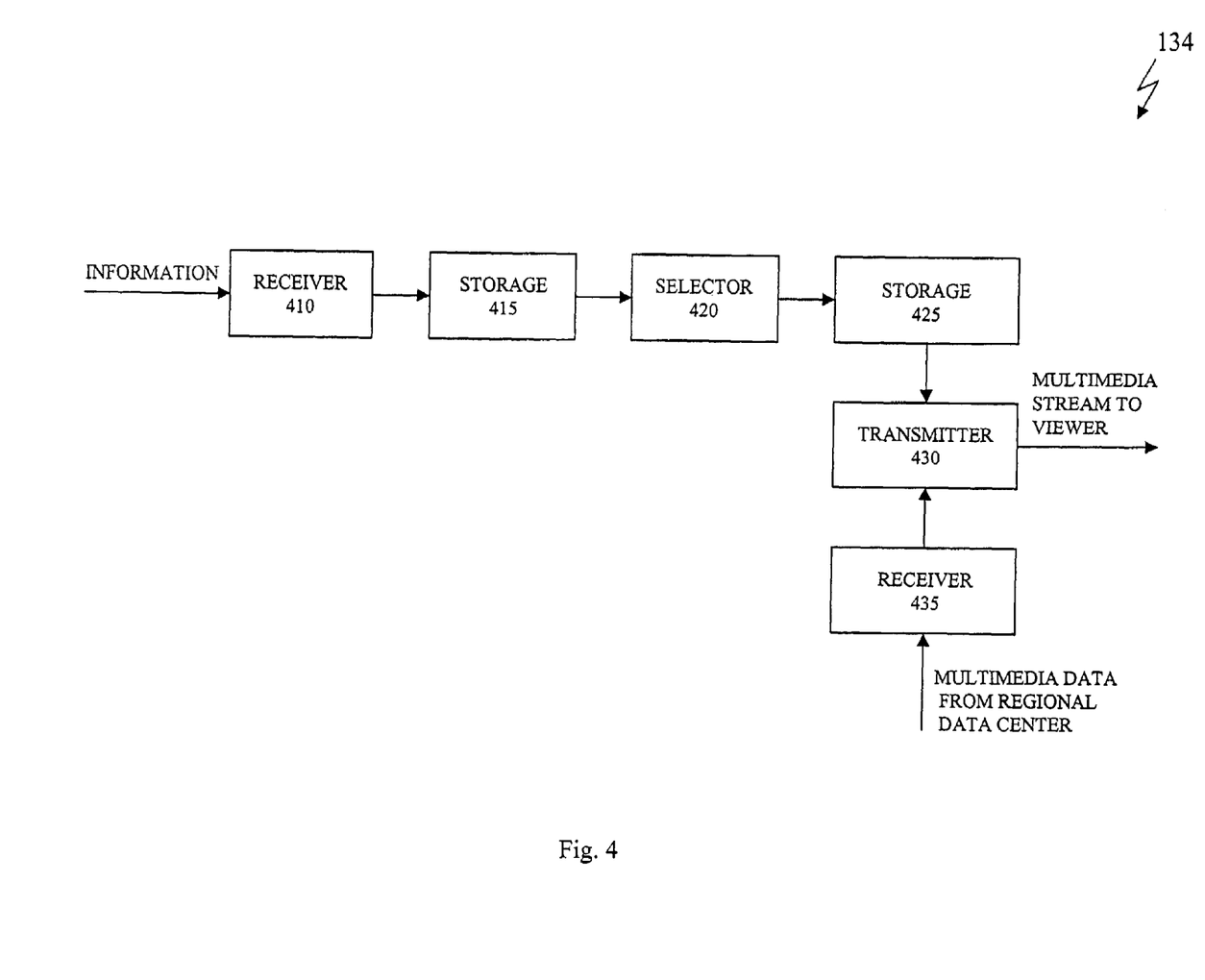
FIG. 4 is a diagram illustrating a block diagram of the server selector system according to yet another embodiment of the invention.

FIG. 4 illustrates a block diagram of the server selector system 134 according to one embodiment of the present invention. Similarly to other embodiments, the elements in the system 400 may be implemented by hardware, software, and firmware alone or in combination thereof. For example, when implement by software, the elements in the system 400 are represented by different modules corresponding to hardware elements in the hardware implementation.

The system 400 includes a receiver 410, a storage 415, a selector 420, a storage 425, a transmitter 430 and a receiver 435. The transmitter 430 and the receiver 435 perform same functions as the transmitter 230, receiver 225 respectively as shown in FIG. 2.

In this embodiment, the viewer is prompted to provide information to the receiver 410 when requesting a multimedia stream. The information may be a geographic location information of the viewer. The information may then be stored in storage 415 and later retrieved from the storage 415 to be used in the edge servers selecting process. The selector 410 narrows the choice of edge sites and selects an edge site to be used to deliver the multimedia streams to the viewer based on the retrieved information. When viewer requests the multimedia streams from the service, the transmitter 430 converts the multimedia data to the multimedia streams and transmits the streams via the selected edge site.

The server selector system 134 provides flexibility for mobile viewers who are accessing the service form many locations. Furthermore, the receiver 410 may receive information on the last several viewer location addresses and stores them in the storage 415. To make the selection more convenient, the viewer location address is retrieved accordingly by the depending the actual location of the viewer at the time to the request for the multimedia streams. Based on this actual location address, the selector 420 can select the preferred edge site to deliver the multimedia stream.

Additional information from the viewer may be provided to the service provider to help the service provider select the server that the service provider determines the best server for the viewer based on the information. In the case where the system 400 is implemented by codes such as an applet, the applet is running on its system. The service provider provides flexibility for mobile viewer who are accessing the service from many locations. The viewer machine may store the addresses of the last several geographic locations for future use. This makes the selection more convenient for both the viewer and the service provider. Often, this is used in the case where the viewer travels between places (e.g., if the viewer travels between Germany and the United Kingdom).

Figure 5:
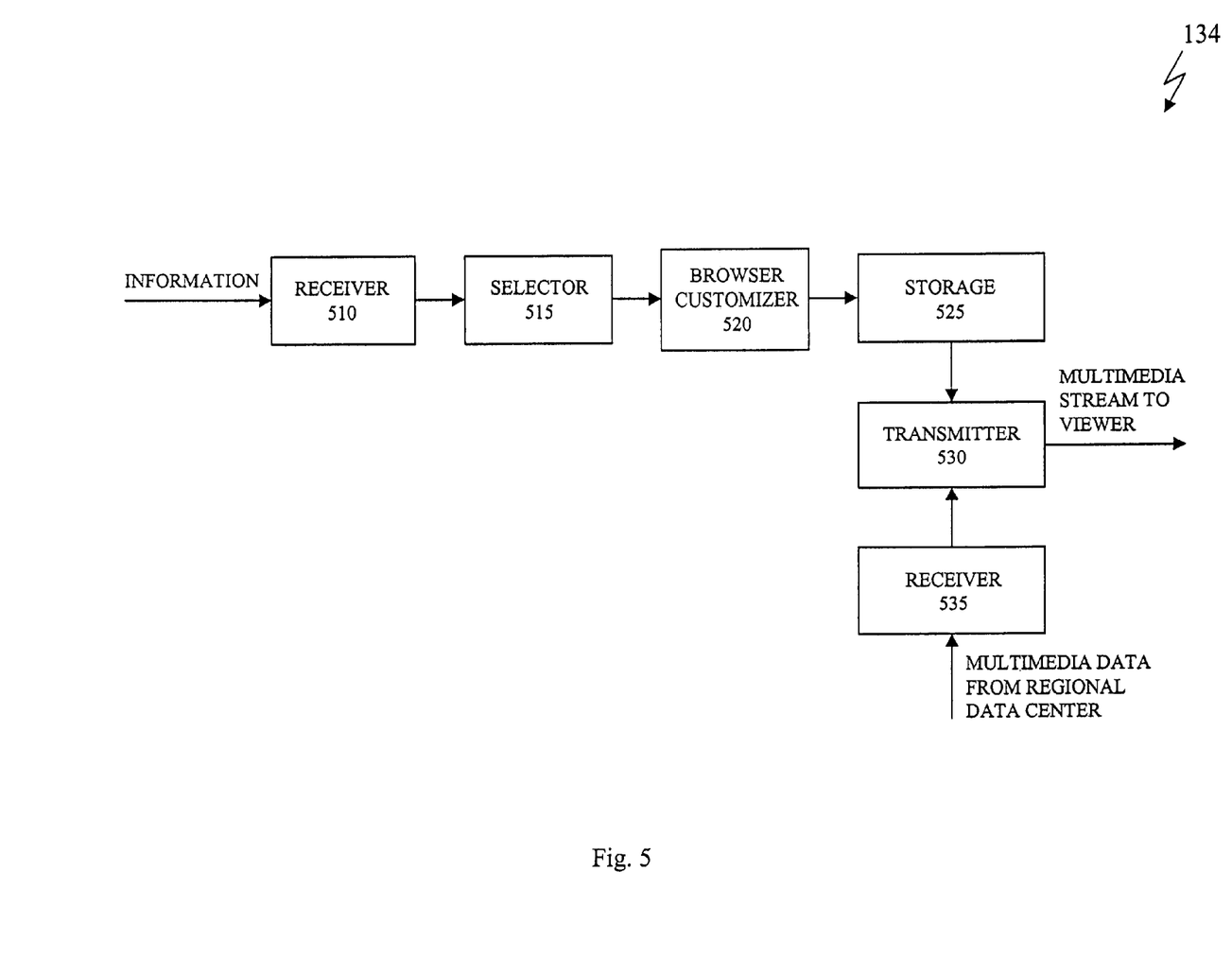
FIG. 5 is a diagram illustrating a block diagram of the server selector system according to yet another embodiment of the invention.

FIG. 5 is a diagram illustrating a server selector system 134 according to one embodiment of the present invention. The system 500 include a receiver 510, a selector 515, a browser customizer 520, a storage 525, a transmitter 530, and a receiver 530.

The receiver 510 receives information such as viewer information (e.g., identification, location, interests, preferences, etc.), regulations, and business reasons. These information may restricts the list of preferred edge sites that can be used to deliver the multimedia stream. The selector 515 may select a list of preferred edge sites based on the received information and store it in the storage 525. The packager 530 packages the information into a text field called cookie to form a message. An installer installs the cookie in a customized browser in the viewer system. The message is sent back to the preferred server when the viewer requests the multimedia streams. The preferred server uses the information and transmits the multimedia streams to the specific viewer accordingly. The function of the transmitter 530 and receiver 530 is the same as the transmitter 230 and receiver 225 respectively as shown in FIG. 2.

Figure 6:
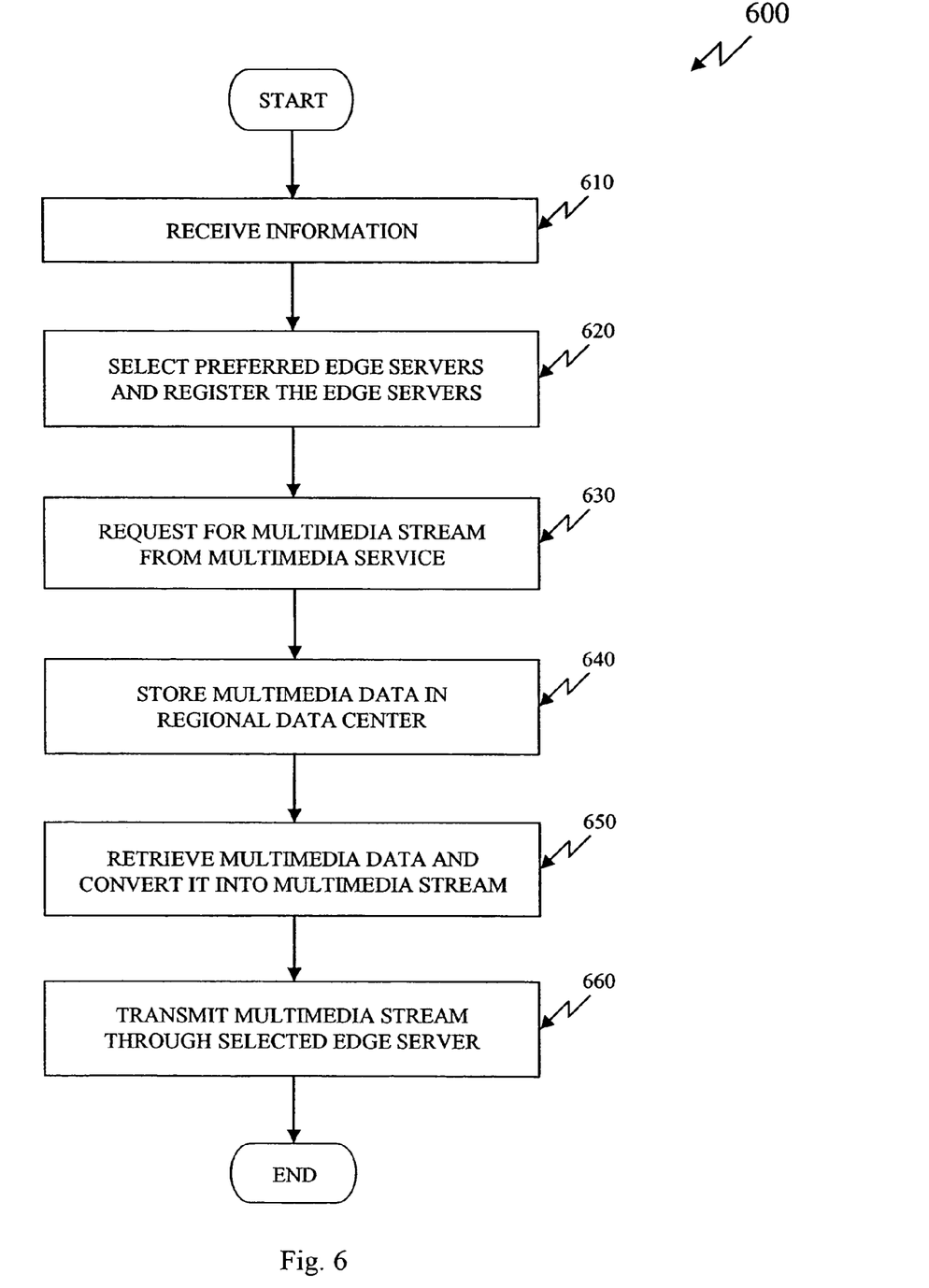
FIG. 6 is a flowchart illustrating a process to select an edge server according to one embodiment of the invention.

The above embodiment may be implemented in hardware, firmware, or firmware or in any combination thereof. When implement in hardware, the above embodiment is described in terms of different device elements. When implement software (e.g., program) or firmware (codes), the embodiment is described in terms of different modules. It is also understood that the viewer may be directed to an edge site other than the one it prefers because of site unavailability, server loading, or network loading. The decision of the redirection is made by the viewers, by the service provider or by the service provider with guidance from the viewer and vice versa. Furthermore, any on the above embodiments may be used alone or in combination by the viewers or by the service providers FIG. 6 is a flowchart illustrating a process 600 to select an edge server according to one embodiment of the invention.

Upon START, the process 600 receives information regarding all the available edge servers (Block 610). The process 600 then selects the preferred edge servers and registers them with a service provider (Block 620). Next, the process 600 requests for multimedia streams from a multimedia service (Block 630). The multimedia service stores its multimedia data in a regional data center (Block 640). The process 600 then retrieves the multimedia data from the regional data center and converts it into multimedia stream (Block 650). Next, The process 600 transmits the multimedia stream through the selected edge servers in the network to the requested viewer (Block 640). The process 600 is then terminated.

Figure 7:
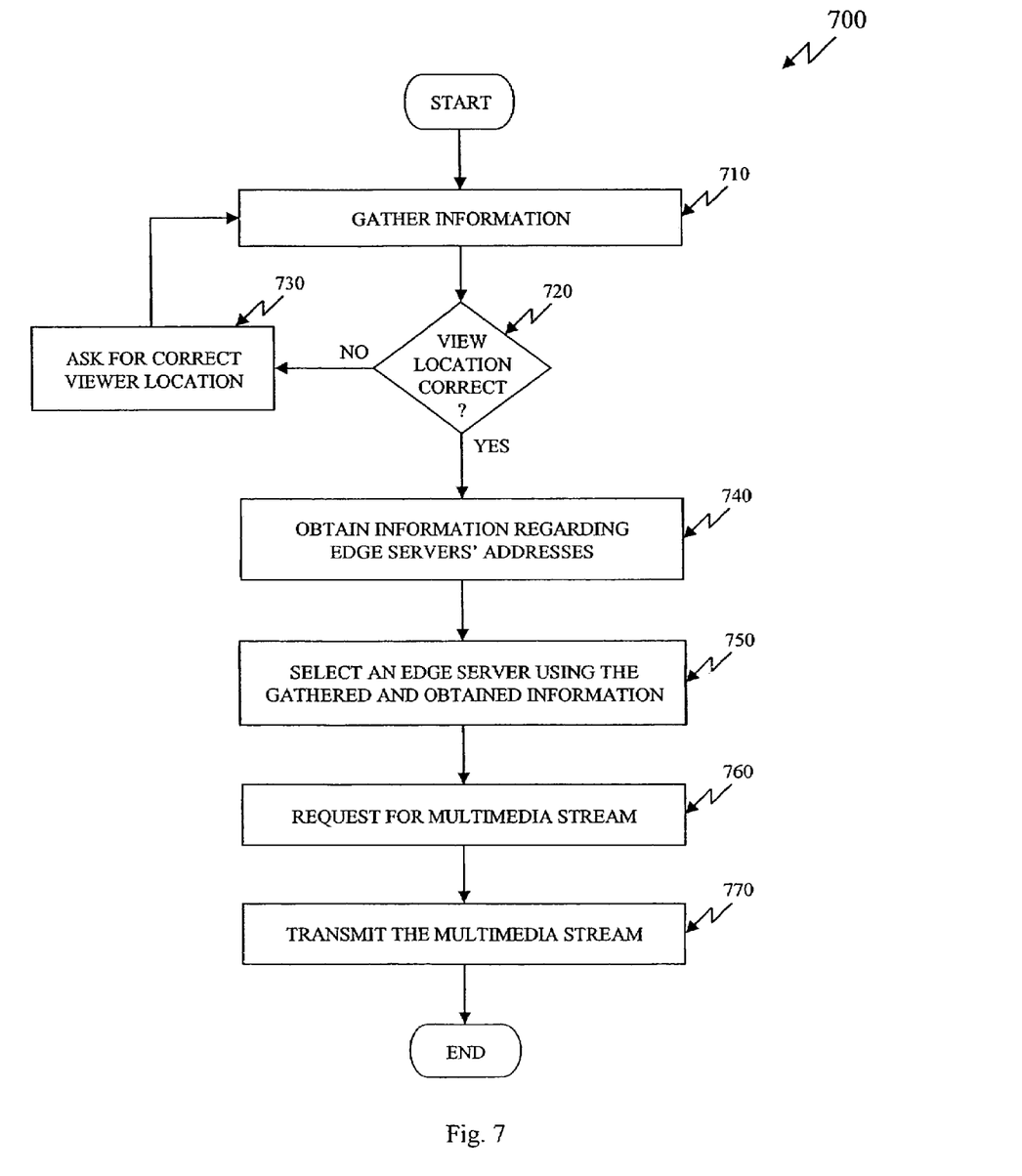
FIG. 7 is a flowchart illustrating a process to select the edge server according to another embodiment of the invention.

FIG. 7 is a flowchart illustrating a process 700 to select an edge server according to one embodiment of the invention.

Upon START, the process 700 gathers information. The information may be information on language reference, time zone, and viewer location (Block 710). Process 700 then confirm whether the viewer location is correct (Block 720). If it is not confirmed, the process 700 then ask for the correct viewer location (Block 730) and then the process 700 goes back to step in Block 710 and continues to the next step. Otherwise, the process 700 obtains information regarding network addresses of edge servers (Block 740). This information can be updated to provide future expansion and changes. This information also may be used to check for the quality of the connections to the servers. Next, the process 700 selects an edge site for the distributing of a multimedia stream using the information gathered in Block 710 and the information obtained in block 740 (Block 750). Then the process 700 requests for the multimedia stream to be distributed to the viewer (Block 760). The process 700 transmits the multimedia stream to the viewer through the selected edge server (Block 770). Then the process 700 is terminated.

Figure 8:
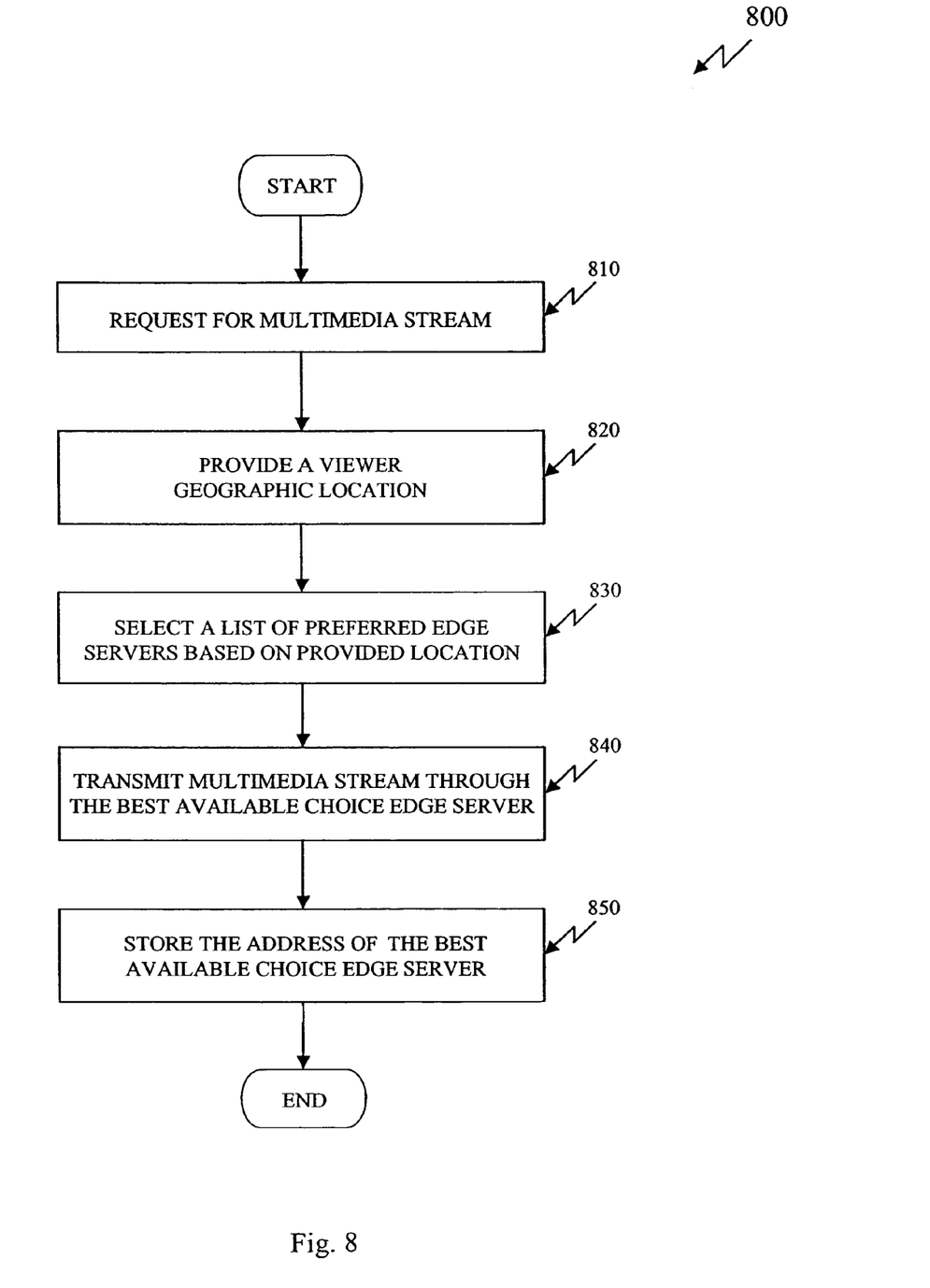
FIG. 8 is a flowchart illustrating a process to select the edge server according to yet another embodiment of the invention.

FIG. 8 is a flowchart illustrating a process 800 to select a server for transmitting a multimedia stream.

Upon START, the process 800 requests a multimedia stream (Block 810). Then, the process provides a viewer geographic location (Block 820). Next, the process 800 selects a list of preferred edge servers in based on the provided information. (Block 830). The preferred edge servers may be listed in the first choice, second choice order. The process 800 then transmits the multimedia stream through the best available choice edge server (Block 840). Next, the process 800 stores the address of the best available choice edge server in a storage (Block 850). The process 800 is then terminated.

Figure 9:
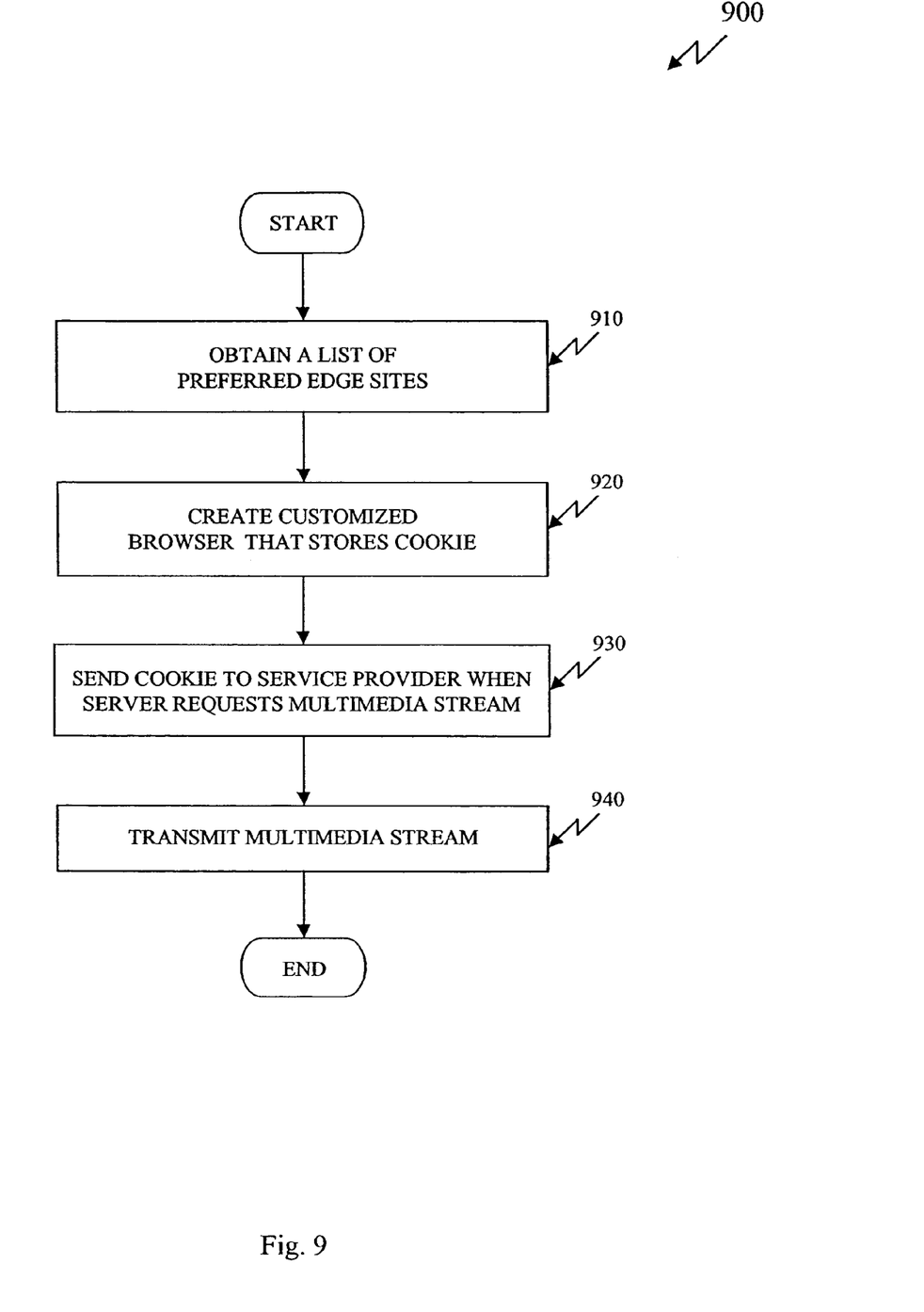
FIG. 9 is a flowchart illustrating a process to select the edge server according to yet another embodiment of the invention.

FIG. 9 is a flowchart illustrating a process 900 to select an edge server according to one embodiment of the invention.

Upon START, the process 900 obtains a list of preferred edge sites (Block 910). A service provider manages the edge sites. Next, the process 900 creates a customized browser that stores the preferences (Block 920). The preferences may be installed in the browser in text file as a cookie. The process 900 sends the cookie to the service provider when requests the multimedia stream (Block 930). The process 900 then transmits the multimedia stream to the viewer based on the information on the cookie (Block 940). The process 900 is terminated.

While this invention has been described with reference to illustrative embodiment, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   receiving a list of servers in a network for display on a viewing system;
   registering information with a service provider by a viewer using the viewing system for storage and later use, the information including a preferred order of edge servers for routing content to a viewer;
   receiving a request by the viewer for the content at the service provider after registering the information; and
   in response to the viewer requesting the content, accessing the information after storage and selecting one of the edge servers to be a selected edge server to receive and to transmit the content to the viewer via the network, the one of the edge servers being automatically selected by the service provider based on the information registered by the viewer.

2. The method of claim 1 wherein the registering of the information comprises registering addresses of each of the edge servers with the service provider.

3. The method of claim 2 wherein the information further comprises a unique identifier (ID).

4. The method of claim 3 wherein the unique (ID) is one of a global user ID number, a network interface card (NIC) serial number, and a number provided by the service.

5. The method of claim 2 further comprising receiving a registration number along with the request, the registration number being assigned by the service provider and used to select the selected edge server.

6. The method of claim 1 wherein the information comprises a plurality of addresses corresponding to each of the edge servers.

7. The method of claim 1 further comprising updating the information.

8. The method of claim 1 wherein the information is geographic information of the viewer.

9. The method of claim 1 further comprising storing a server location at a viewer location.

10. The method of claim 1 further comprising storing the information in a text file, the information being given to a browser by the selected edge server.

11. The method of claim 10 further comprising sending the text file to the edge server when a page is requested from the edge server.

12. The method of claim 10 wherein the text file is a cookie identifying a viewer.

13. The method of claim 1 wherein the network is one of a Local Area network (LAN) and a Wide Area Network (WAN).

14. The method of claim 1 wherein the network is a network indicating a type of a connection.

15. The method of claim 14 where the type is one of a Dense Wavelength Division Multiplexing (WDM), a Asynchronous Transfer Mode (ATM), an Ethernet, and a dial up modem.

16. A system comprising:
a viewing system adapted to receive a list of servers in a network for display; and
a service provider including
means for registering information from a viewer using the viewing system, the information being stored for later use and including a preferred order of edge servers for routing content to a viewer,
means for receiving a request by the viewer for the content after registering the information at the service provider, and
means for accessing the information after storage and selecting one of the edge servers to be a selected edge server to receive and to transmit the content to the viewer via the network in response to the viewer requesting the content, the one of the edge servers being automatically selected by the service provider based on the information registered by the viewer.

17. A system comprising:
a viewing system adapted to receive a list of servers in a network for display; and
a service provider including
a memory to register and store information from the viewing system, the information being stored for later use and including a preferred order of edge servers for routing content to the viewing system, and
a processor adapted to receive a request by the viewing system for the content after the information has been registered and stored, to access the information after storage, to select one of the edge servers to be a selected edge server to receive and to transmit the content to the viewing system, the one of the edge servers being automatically selected based on the information registered from the viewing system.

18. The apparatus of claim 17 wherein the memory to register the information by storing addresses of each of the edge servers.

19. The apparatus of claim 18 wherein the information stored in the memory further comprises a unique identifier (ID).

20. The apparatus of claim 19 wherein the unique (ID) is one of a global user ID number, a network interface card (NIC) serial number, and a number provided by the service.

21. The apparatus of claim 17 wherein the information comprises a plurality of addresses corresponding to each of the edge servers.

22. The apparatus of claim 17 wherein the information is a text file, the information being given to a browser by the selected edge server.

23. The apparatus of claim 22 wherein the text file is a cookie identifying a viewer using the viewing system.

* * * * *

UNITED STATES PATENT AND TRADEMARK OFFICE
CERTIFICATE OF CORRECTION

PATENT NO. : 7,197,566 B1
APPLICATION NO. : 09/675756
DATED : March 27, 2007
INVENTOR(S) : Kuzma It is certified that error appears in the above-identified patent and that said Letters Patent is hereby corrected as shown below:

In column 1, at line 14, delete "continuously" and insert --continuous--.
In column 2, at line 48, delete "lice" and insert --like--.
In column 5, at line 49, delete "is".

Signed and Sealed this

Twenty-seventh Day of November, 2007

JON W. DUDAS
*Director of the United States Patent and Trademark Office*